Figure 1:
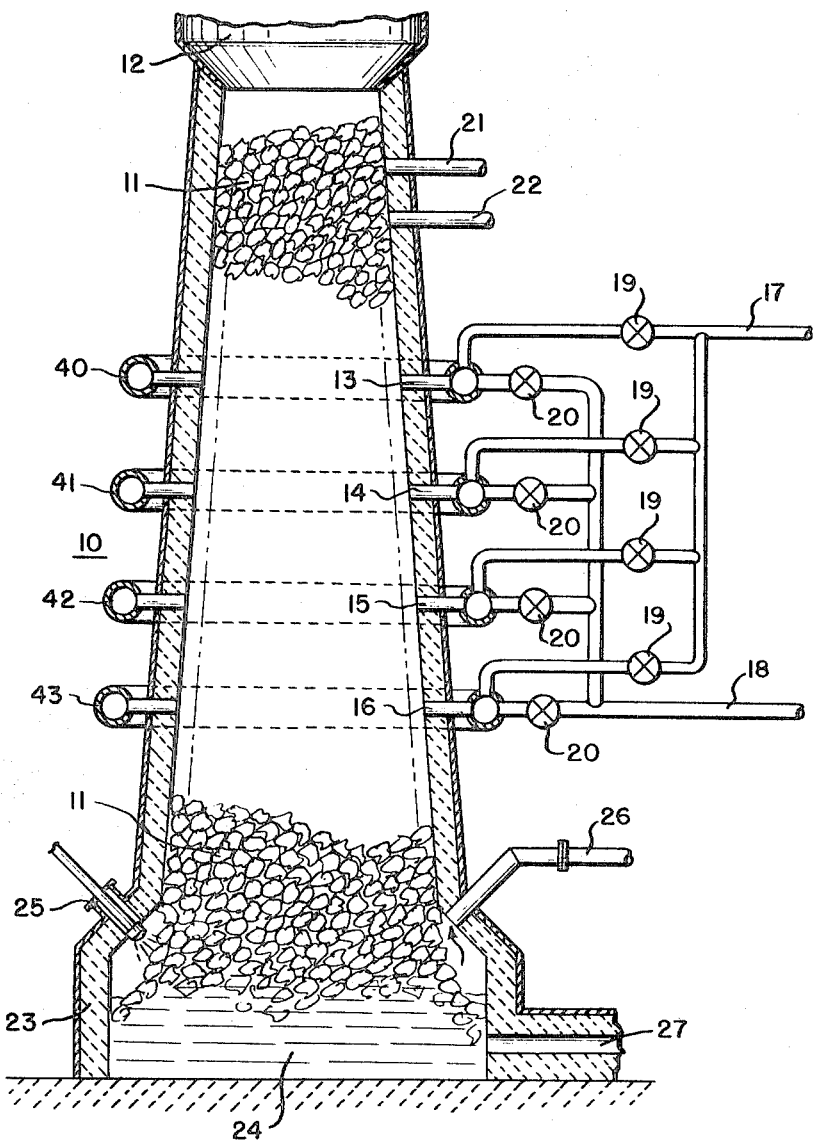

United States Patent

[11] 3,615,351

| [72] | Inventors | John Happel<br>Hastings-on-Hudson;<br>Joachim Hillard Blanck, Glen Oaks, both of N.Y. |
|---|---|---|
| [21] | Appl. No. | 854,213 |
| [22] | Filed | Aug. 29, 1969 |
| [45] | Patented | Oct. 26, 1971 |
| [73] | Assignee | Northfield Mines, Inc.<br>New York, N.Y.<br>Continuation-in-part of application Ser. No. 468,864, July 1, 1965, now abandoned. |

[54] DIRECT GASEOUS REDUCTION OF IRON OXIDE
13 Claims, 2 Drawing Figs.

[52] U.S. Cl. ........................................... 75/38, 75/34
[51] Int. Cl. ........................................... C21b 13/02
[50] Field of Search ........................................... 75/33, 34, 38, 35, 40

[56] References Cited
UNITED STATES PATENTS

| 3,236,628 | 2/1966 | Von Bogdandy | 75/42 |
| 3,205,065 | 9/1965 | Mayer et al. | 75/34 X |
| 2,952,533 | 9/1960 | Cuscoleca et al. | 75/41 |
| 2,609,288 | 9/1952 | Stuart | 75/34 |

Primary Examiner—L. Dewayne Rutledge
Assistant Examiner—J. Davis
Attorney—Pennie, Edmonds, Morton, Taylor and Adams ABSTRACT: Molten iron is produced directly from high grade iron oxide ore by the direct reduction in a vertical shaft furnace of preheated ore with hydrogen and carbon monoxide gaseous mixtures. The mixtures of hydrogen and carbon monoxide are adjusted to maintain a continuously increasing $H_2$:CO ratio in the direction the charge passes through the vertical reduction zone while maintaining about the same temperature, below about 1,100° C., throughout the entire reduction zone.

PATENTED OCT 26 1971          3,615,351

INVENTORS
JOHN HAPPEL
J. HILLARD BLANCK
BY
ATTORNEYS

DIRECT GASEOUS REDUCTION OF IRON OXIDE

This application is a continuation-in-part of application Ser. No. 468,864, filed July 1, 1965, now abandoned.

This invention relates to the production of molten iron from iron oxide and, more particularly, to a direct gaseous reduction process using a gas mixture containing carbon monoxide and hydrogen to reduce the iron ore or other iron oxides and subsequently to recover the reduced product in its molten state. This invention also relates to an apparatus suitable for carrying out the process of this invention.

Reducing gases, such as carbon monoxide, hydrogen, and natural gases, have been used as chemical reactants for the reduction of iron ores, particularly for the production of sponge irons. The methods that utilize these gases for the reduction of iron ores have not received wide commercial acceptance. Their failure may be attributed to the high production cost and low quality of the products. However, because of the growing scarcity of high-grade coking coal and the relatively low capital investment required, as compared to the conventional blast furnace process, these gas reduction processes remain attractive in certain localities where there are abundant resources of high-grade iron ore, but a lack of capital investment and coking coal.

Heretofore, gaseous reduction has been used predominantly in sponge iron processes in which the reduced product is directly recovered from the reduction furnace as hot reactive porous solids. Handling the hot sponge iron creates numerous technical and operational difficulties. Unless a special procedure is used, some degree of reoxidation usually occurs. Except for few uses, sponge iron, which contains a liberal amount of iron oxides and impurities, must be further refined to iron or steel before it has other commercial utilities. Generally, the sponge iron, which melts slowly, is pressed into compact masses, pigs, or briquettes before it is charged into a melting furnace for additional refining. Technical difficulties in handling the product and the additional refining required tend to increase the production costs and lower the commercial value of sponge iron. Presently, sponge iron commands a market value only that of the scrap iron.

More recently, attempts have been made to eliminate the elaborate operational procedures for the gaseous reduction processes by directly charging the reduced product into an electric furnace for melting. This type of a process, while it eliminates some problems in handling the hot reactive sponge iron and conserves heat, is not commercially attractive unless very low cost electricity is available. The incompletely reduced products require that the bulk of reduction be carried out in the electric furnace which severely taxes the furnace capacity and severely increases the consumption of electric power.

It is, therefore, the principal object of this invention to overcome the disadvantages stated hereinabove by providing a direct gaseous reduction process which utilizes gaseous mixtures containing hydrogen and carbon monoxide to reduce iron ore or other iron oxides. Preferably the reduced product is subsequently recovered in a molten state.

Broadly stated, the process of this invention comprises preheating the iron oxide ore to below its sintering temperature and then feeding the preheated ore progressively downwardly into and through a vertical reduction zone and simultaneously subjecting it to the reducing action of gaseous mixtures comprising $H_2$ and $CO$. The hydrogen and carbon monoxide gas mixtures are adjusted along the reduction zone to provide a CO-rich gas at the upper portion of the reducing zone, a continuously increasing ratio of $H_2:CO$ from the upper portion to the lower portion of the reducing zone, and a $H_2$-rich gas at the lower portion of the reducing zone to reduce the ore substantially completely to metallic iron. The ratio of $H_2:CO$ in the gas mixtures in each portion of the reducing zone is that which maintains the temperature in such portion at a preselected value which is below the sintering temperature of the charge and is substantially uniform throughout the entire reduction zone. Preferably, a pool of molten iron is maintained directly below the reduction zone. The reduced iron product from the reduction zone is forced beneath the surface of the pool of molten iron by the weight of the overlying charge. The reduced iron immersed in the pool of molten iron is melted by supplying the necessary heat directly to the pool.

Advantageously, the process is carried out in a vertical shaft furnace having an inlet at its top for the loading of the ore and an outlet at its bottom for discharging the reduced ore. Gas inlets are disposed along the vertical length of the furnace and around its circumference for supplying gas mixtures containing carbon monoxide and hydrogen to the furnace to effect the reduction of the ore contained therein. There are means for adjusting the various gas mixtures to provide in a major portion of the furnace carbon monoxide-hydrogen gas mixtures having carbon monoxide and hydrogen volume ratios which continuously increase in percent hydrogen in the gas mixture in going from the upper portion of the furnace to the lower portion. The upper portion is rich in carbon monoxide and the lower portion is rich in hydrogen to effect substantially completely the reduction of the ore to its metallic state. These gas mixtures are sufficient to maintain an adiabatic reaction of the iron ore while maintaining substantially the same reaction temperature throughout the furnace (isothermal conditions). In the preferred embodiment of this invention, an ore melting hearth is connected to the outlet of the furnace at the lower portion of the furnace to receive the discharge from the furnace. The hearth has at least one burner which is used to provide additional heat for melting the charge, and at least one outlet for removing the molten product, and a gas outlet for withdrawing the the exhaust gas in the hearth. Means are also provided for preventing the exhaust gas in the hearth from entering into the reducing zone.

The iron ores used in this invention preferably are the type which will contain a high percentage of iron oxides, and a low percentage of slag concentrates, and the crushed ore is in lump form. We found that iron ores which contain at least 67 percent iron and less than 1 percent siliceous compounds are eminently suitable for this process. Naturally occurring ores of this type are available in many localities. Large deposits of suitable iron ores are currently found in Brazil and Baffin Land. However, the invention is not limited only to the treatment of high grade iron ores. For example, iron concentrates could be processed according to the invention.

In carrying out the process of this invention, the ore charge is preferably preheated to a temperature below its fusion or sintering temperature, that is, to a temperature which does not exceed about 1100°C. Advantageously, the preheating operation is conducted immediately above the reduction zone by burning the partially spent reduction gas mixture. When the reduction process is performed in a vertical furnace, for example, injection of air at the upper portion of the furnace will allow the combustion of the hot and partially spent reduction gas mixture and simultaneously preheat the cold ore.

In the reduction zone, the preheated ore is reduced by gas mixtures containing hydrogen and carbon monoxide. The reduction reaction between the reduction gases and iron ores is rather complex. However, a somewhat simplified example can be shown by the reduction of $Fe_2O_3$ (hematite) by carbon monoxide-hydrogen gas mixtures. The basic reactions which occur are given by the following four equations, ($\Delta H_r$ = heat reaction at 1000° C.)

I. $Fe_2O_3 + H_2 \rightleftharpoons 2FeO + H_2O \Delta H_r = 10,080$ B.t.u./Mole
II. $FeO + H_2 \rightleftharpoons Fe + H_2O \Delta H_r = +7,900$ B.t.u./Mole
III. $Fe_2O_3 + CO \rightleftharpoons 2FeO + CO_2 \Delta H_r = -3,750$ B.t.u./Mole
IV. $FeO + CO \rightleftharpoons Fe + CO_2 \Delta H_r = -5,930$ B.t.u./Mole In both instances (using $H_2$ or $CO$), the iron ore is first reduced to FeO before any appreciable reduction of FeO to Fe takes place. Also, as shown by the above reactions, analysis indicates that the overall reactions of hydrogen and iron oxides are endothermic (+) and those of carbon monoxide and iron oxides are exothermic (−). Using a gaseous mixture containing a proper volume ratio of hydrogen and carbon monoxide, therefore, will provide an isothermal or nearly isothermal mode of reduction operation which will substantially eliminate the necessity for supplying or removing additional heat during the reduction process. The exact gas composition that will effect an adiabatic reaction without substantial increase or decrease of the reaction temperature depends on a number of factors, such as the size of the equipment, physical and chemical properties of the ore, reaction rate, temperature, etc. We found that for a substantially adiabatic (no addition or removal of heat from a system) and isothermal (constant temperature in a system) mode of reduction of high-grade iron ore, the volume ratio of $H_2$ to CO in the upper portion of the furnace (CO-rich gas mixture) should be in the range of about 0.3 to 0.6 and this ratio in the lower portion of the furnace ($H_2$-rich gas mixture should be in the range of about 1 to 25. Operating at temperatures below the sintering or fusion point of iron oxides (i.e., preferably at a temperature of about 800° C. to 1100° C.), we found the optimum gas mixtures that will provide the most effective and rapid reduction in both the upper and lower parts of the furnace and which will maintain isothermal conditions throughout the reduction zone lie within the above volume ratios.

By establishing a substantially adiabatic and isothermal mode of reaction by continuously increasing the $H_2$:CO ratio from the upper portion to the lower portion of the furnace, we found that the process of this invention overcomes a number of technical difficulties that have contributed to the failure of numerous prior attempts to develop a direct gaseous reduction process for iron oxide. Essentially, when the reduction reaction is endothermic or exothermic, heat must be added or removed during the process. Poor heat transfers in a large bed of ore prevent effective addition or removal of heat which leads to uneven heat distribution and creates local hot and cold spots in the furnace. When the temperature in the hot spots is too high, fusion of the ore will occur leading to agglomeration, incomplete reduction and lower furnace capacity. On the other hand, when the temperature in the cold spot is too low, the reduction reaction will proceed too slow for a complete reduction of iron oxides. By using a substantially adiabatic mode of reaction, this invention eliminates the requirement for the installation of heating or cooling equipment in the reduction furnace. Also, by establishing a molten pool of iron below the reduction zone and discharging the reduced iron product directly into the iron pool by forcing the reduced iron product from the reduction zone beneath the surface of the pool of molten iron by the weight of the overlying charge, the problem of forming an oxide of the already reduced iron is eliminated.

Figure 2:
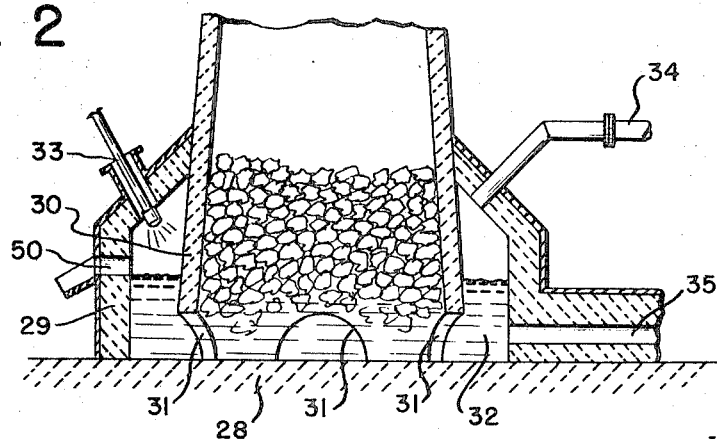

Further to illustrate this invention, specific embodiments and examples are described hereinbelow, with reference to the accompanying drawings wherein FIG. 1 is a schematic drawing of a cross section of an apparatus of this invention, and FIG. 2 is a fragmentary section showing the lower portion of a second embodiment of this invention.

To carry out the process of this invention, using the apparatus shown in FIG. 1, a suitable high-grade lump ore is first crushed to a maximum diameter of less than 2½ inches. Although there is no critical limitation about the sizes of the ore, generally it is more economical to use sizes less than 2½ inches because reduction rates are much slower for the larger sizes. Excess reduction of the sizes of the ore, however, is not warranted because of the increased tendency for the ore to form undesirable fines. A charge stock comprising lumps in the average diameter of three-fourths inch to 1 inch is suitable. The properly prepared stock is then charged into the vertical shaft furnace 10 to form a descending bed of iron ore 11. Loading of the furnace is facilitated by hopper 12 provided at its top. The hopper 12 is preferably equipped with a valve (not shown in FIG. 1) to control the feed of the charge stock to the shaft. After initial loading, the valve is opened periodically to fill the descending bed of ore in the shaft during the regular run. The rate of descent of the charge is controlled by the rate at which the reduced iron is melted in the melting zone. Besides the arrangement described, whereby the iron ore descends down through the furnace by the force of its own weight, some positive mechanical means can be employed for controlling the flow of the ore down through the furnace. For example, a moving grate could be used in the furnace for control.

The reducing gases for the deoxidation of the iron ore are introduced into the furnace by gas inlets 13, 14, 15 and 16 which are arranged along the vertical length of the gas furnace. It is preferred that the carbon monoxide-hydrogen gas mixtures be preheated to approximately the reduction temperature of the operation prior to being introduced into the reduction zone. The preheating can be accomplished by any of the well-known conventional means. At each of these gas inlet levels there are bustel pipes 40, 41, 42 and 43 which fit around the circumference of the furnace and allow for several gas inlets at each of the levels in the furnace. Each of these gas inlets is connected to carbon monoxide and hydrogen supply sources by pipes 17 and 18, respectively. The volume ratio of carbon monoxide and hydrogen in the gaseous mixtures at the various parts of the furnace is adjusted by valves 19 and 20. It is noted that the introduction of gas mixtures at four different levels as shown in FIG. 1, is only an illustration of one possible type of arrangement. The gas inlets could be located at five, six, etc., different levels in the furnace.

While the gases supplied to the gas inlets by pipes 17 and 18 may be pure hydrogen and carbon monoxide, in practice it is more convenient and economical to deliver separately a carbon monoxide rich gaseous mixture and a hydrogen rich gaseous mixture generated from solid carbonaceous fuels petroleum, or natural gases. The specific choice of gases would largely depend on the availability of fuels at the plant site. For example, pipe 17 may be supplied with a gaseous mixture from the partial combustion of a carbonaceous fuel, such as coke, coal, or lignite to give a gas rich in carbon monoxide. Pipe 18 may be supplied by a gas mixture produced by utilizing the reaction of contacting hot carbon with steam which results in a gas with a $H_2$ to CO ratio of about 1:1. When petroleum or natural gases are readily available, a simple process employing partial combustion of the fuel may be used. Essentially, this process consists of burning the fuel incompletely to produce a mixture of carbon monoxide and hydrogen. The reaction of steam with $CH_4$ results in a gas with a $H_2$ to CO ratio of 3:1.

Before the ore is introduced into the reduction zone of the furnace, it is preferably preheated to the reduction temperature. The preheating operation is carried out conveniently by the combustion of the partially spent reducing gases. Air inlet 21, located above the reduction zone, is used to supply the necessary oxygen for the combustion. Air fed to the furnace is also preferably preheated to give maximum thermal efficiency. Depending on the thermal properties of the ore, and the heating value of the spent reducing gas, the preheating step may use more then one-third of the total amount of spent reducing gases to raise the temperature of the ore to about 1,000° C. The excess spent reducing gases not required for the preheating operation are withdrawn from the furnace through gas outlet 22 located below the air inlet. The gases withdrawn are reprocessed to remove water and carbon dioxide and are subsequently recycled. The combustion exhaust is removed by a vent (not shown).

The preheating step brings the ore to the proper reduction temperature so that adiabatic reduction of the ore can proceed immediately when the ore reaches the reduction zone. The temperature of the ore after preheating, hence the temperature for the adiabatic and substantially isothermal mode of reaction, can be as low as 800° C. However, the dependency of the reduction rate and the percentage of deoxidation on the temperature suggest the use of a maximum allowable temperature. The upper temperature limit for the reduction therefore, is just below the sintering or the fusion temperature of the ore. Thus, the reduction temperature is low enough so that no incipient fusion or sintering of the ore takes place and therefore any stickiness of the ore, as it moves down through the furnace, is avoided. A temperature of about 1,100° C. for a high-grade iron ore is found to be eminently suitable.

Because of the large number of variables and the complexities of the reactions between iron oxides and reducing gases CO and $H_2$, selection of the proper gaseous compositions used in the reduction zone must be determined separately for each individual operation. From our study, we find it is advantageous to use a reducing gaseous mixture richer in carbon monoxide in the initial stages of the reduction. The mixture can be progressively leaner in carbon monoxide as the reduction progresses. The plurality of gas inlets 13 to 16 arranged along the vertical length of the furnace effectively provides the required varying gaseous compositions in the furnace. For example, in reducing a high-grade iron ore, which can be considered to consist essentially of hematite ($Fe_2O_3$) and magnetite, a gaseous mixture consisting of 73 percent carbon monoxide and 27 percent hydrogen provides an isothermal operation at 1,000° C. in an adiabatic reduction process for the initial length of the reduction zone where the ore is introduced and initially reacts with the gaseous mixture.

In the reduction of $Fe_2O_3$ with a $CO-H_2$ mixture, using equal reaction rates for both hydrogen and carbon monoxide and a 3:1 by volume ration of $CO:H_2$ (the heat required ($Q_r$) for 0.2 parts by weight moles of $Fe_2O_3$ to form FeO with pure $H_2$ is +2016 B.t.u./Mole $Fe_2O_3$ whereas the heat required for the same reaction with pure CO is $-750$ B.t.u./Mole $Fe_2O_3$), the specific gas composition required for isothermal operation is computed as follows:

Using 0.2 parts by weight moles of $Fe_2O_3$ and considering that at the upper portion of the furnace the $Fe_2O_3$ reacts to FeO, then the heat required or given up by the reactions with CO and $H_2$ is calculated as follows:

$Q_r(CO)=(0.75)(0.2)(-3750)=-562.5$ B.t.u./Mode $Fe_2O_3$
$Q_r(H_2)=(0.25)(0.2)(+10,080)=+504$ B.t.u./Mole $Fe_2O_3$ The net heat required at this upper portion of the furnace is hence:

$Q_{net}=-562.5+504=-58.5$ B.t.u./Mole $Fe_2O_3$ or that 58.5 B.t.u. must be removed to keep this portion of the furnace in isothermal condition. For any portion of the furnace to have isothermal operation at 1,000° C. the ratio of CO to $H_2$ can be calculated as follows:

Let Y = mole fraction of CO
$\Delta H_r(CO)=(0.2)(y)(-3750) = $ heat liberated
$\Delta H_r(H_2)=(0.2)(1-y)(+10,080) = $ heat required For isothermal operation, the heat load is equal to zero, hence:

$$0.2y(-3750)+0.2(1-y)(+10,080)=0$$
$$y=0.73$$

Thus, a mixture of 73 percent CO and 27 percent $H_2$ would be required at the upper portion of the furnace to maintain a steady temperature of 1,000° C. At the upper portions of the reduction zone the reaction consists mainly of the conversion of $Fe_2O_3$ to FeO. As the ore progresses down the reduction zone, the amount of available $Fe_2O_3$ decreases and the amount of FeO which is converted to Fe increases until at the lower portions of the reduction zone the material is basically all Fe with some FeO which is being converted to Fe. If the 73 percent CO—27 percent $H_2$ gas mixture were to be used in the entire length of the reduction zone an exothermic reaction would prevail because of the greater amount of FeO which is being converted to Fe and the lesser amount of $Fe_2O_3$ which is being converted to FeO in these portions of the reduction zone. Therefore, to maintain an isothermal-adiabatic reaction along the length of the furnace, the gas composition used along the downward length of the furnace continuously increases in hydrogen concentration.

This finding is especially significant in the process of this invention because of the particular nature of the $CO-H_2$ mixture in the reduction process. It was also discovered that a mixture of CO and $H_2$ is more effective than if CO or $H_2$ were used alone in the reduction of iron oxides. However, the optimal CO and $H_2$ mixture that provides that most effective reduction of iron oxide in terms of reduction rate and percentage of deoxidation has a higher hydrogen content that the isothermal-adiabatic composition. For example, only 46 percent of deoxidation is observed when magnetite is reduced at 1,000° C. by 100 percent carbon monoxide for 2 hours. Under similar conditions, a 50 percent CO—50 percent $H_2$ mixture provides 88 percent deoxidation. As the hydrogen content increases, the percentage of the deoxidation rises until it reaches an optimal composition which is found to be 75 percent $H_2$ and 25 percent CO. Further increase of the $H_2$ content lowers the effectiveness of the $CO-H_2$ mixture. At 1100° C., the optimal composition is found to be 90 percent $H_2$ and 10 percent CO. Similarly, optimal gaseous mixtures can be obtained for other iron ores at different operative conditions. Generally, for high-grade iron ore, a $CO-H_2$ mixture containing hydrogen in the range from 50 percent $H_2$ to 95 percent $H_2$ is found to be most effective at the optimal temperature range. If selecting gas compositions that will provide the most effective reduction of the iron ore, the endothermic and exothermic relationship established between $H_2$ and CO must be taken into consideration so the mixture used will not create a sudden drop of temperature in the reduction zone when the gas compositions change from CO rich to $H_2$ rich mixtures.

In practice, a clear separation between CO rich and $H_2$ rich sections in the reduction zone cannot be established. However, by feeding the gas inlet 13 with a substantially CO rich gas mixture, gas inlet 16 with a substantially hydrogen rich mixture, and the intermediate gas inlets 14 and 15 with gaseous mixtures for maintaining an isothermal-adiabatic reduction, an effective gaseous atmosphere can be established within the furnace for the most efficient reduction of iron ore heretofore realized.

Subsequent to reduction, the product is in the form of hot, finely divided iron. Preferably, the reduced product from the furnace 10 is discharged directly to a melting hearth 23 connected to the outlet of the furnace and into a pool of molten metal 24. Since the reduced iron is in a hot finely divided form, in order to melt the iron and prevent oxidation, the reduced iron is pushed into the molten pool of iron by the weight of the overlying charge. Thus, the porous reduced iron will be prevented from floating on top of the melt. Since the reduction is carried out at a temperature just below the melting point of the iron, only a relatively small amount of additional heat is needed to melt the reduced ore. The required heat is supplied conveniently by burner 25 which may burn pulverized solid carbonaceous fuel, petroleum, or natural gases. Other heating means may also be used to supply the necessary heat. The furnace can be maintained preferably at a slightly higher pressure than the pressure of the hearth to create a pressure lag between the furnace and the hearth to avoid contamination of the reducing atmosphere. The higher pressure in the furnace would allow the exhaust from burner 25 and a small amount of escaped reducing gases to be removed through outlet 26. The molten iron is drained from outlet 27 for casting.

Alternatively, and as preferred in the invention the exhaust is prevented from entering the furnace by the arrangement shown in FIG. 2. In this arrangement, the shaft furnace 10 extends to the base 28 of the melting hearth 29 to form a skirt 30. Openings 31 are provided at the skirt below the liquid line of the molten metal 32 to create an effective hydraulic seal to prevent the exhaust generated by burner 33 from entering into the furnace. The exhaust from the burner is established through gas outlet 34. Similar to the arrangement shown in FIG. 1 the molten iron is drawn from outlet 35 for casting. In the melting zone, a slag taphole 50 is located in the melting hearth 29 so that slagable impurities can be removed from the surface of the molten metal 32 in accordance with usual practices.

FIG. 2 is illustrative of a furnace arrangement in which the molten metal 32 is heated by means of a burner 33. However, the invention is in no way limited to this type of heating means. Any of the various conventional heating means could be used to heat the molten metal. For example, an electric arc or an electric resistance type of furnace could be used. Also, a refractory muffle flue type of system could be used for heating the molten metal.

The quality of the iron produced by the process of this invention depends on the grade of the iron ore used. For a high-grade iron ore, the iron has a composition approaching that of steel. A specific example showing the initial chemical analysis of a high-grade iron ore separated into hematite and magnetite and the final composition of the reduced products is shown in tables I and II;

TABLE I

| Component | Hematite | Magnetite |
|---|---|---|
| Total Iron | 70.12 | 72.20 |
| FeO | 3.71 | 12.11 |
| $SiO_2$ | 0.36 | 0.14 |
| $Al_2O_3$ | 0.14 | 0.15 |
| CaO | 0.10 | 0.31 |
| MgO | 0.25 | 0.06 |
| MnO | 0.10 | 0.25 |
| $TiO_2$ | 0.16 | 0.014 |
| S | 0.007 | 0.021 |
| P | 0.039 | 0.64 |
| $CO_2$ | 0.98 | 2.87 |
| Gain on Ignition | 0.32 | |

TABLE II

| Component | Metallized Hematite | Metallized Magnetite |
|---|---|---|
| Total Iron | 99.31 | 99.36 |
| Metallic Iron | 96.41 | 98.17 |
| $SiO_2$ | 0.26 | 0.41 |
| $Al_2O_3$ | 0.09 | 0.10 |
| CaO | Trace | Trace |
| MgO | Trace | Trace |
| MnO | 0.14 | 0.08 |
| $TiO_2$ | 0.14 | 0.03 |
| S | 0.046 | 0.051 |
| P | 0.003 | 0.006 |
| carbon | nil | nil |

We claim:

1. A process for the production of molten iron from iron oxide ore comprising:
   a. preheating said ore to below its sintering temperature,
   b. feeding the preheated ore preheated ore progressively downwardly into and through a vertical reduction zone and simultaneously subjecting it to the reduction zone and simultaneously subjecting it to the reducing action of gaseous mixtures comprising $H_2$ and CO,
   c. adjusting the $H_2$ and CO content of the gaseous mixtures along the vertical reduction zone to provide (i) CO-rich gas at the upper portion of the reducing zone, (ii) a continuously increasing ratio of $H_2$:CO from the upper portion to the lower portion of the reducing zone, and (iii) $H_2$-rich gas at the lower portion of the reducing zone to reduce said ore substantially completely to metallic iron, the ratio of $H_2$:CO in the gas mixtures in each portion of the reducing zone being that which maintains the temperature in such portion at a preselected value which is below the sintering temperature of the charge and is substantially uniform throughout the entire reduction zone, and
   d. recovering the resulting metallic iron.

2. The process according to claim 1 in which the reduction is carried out at a temperature range of about 800° C.–1100° C.

3. The process according to claim 1 in which the CO-rich gas at the upper portion of the reduction zone has a volume ratio of $H_2$:CO of about 0.3 to 0.6:1 and the $H_2$-rich gas at the lower portion of the reduction zone has a volume ratio of $H_2$:CO of about 1 to 25:1.

4. The process according to claim 1 in which the iron oxide ore contains at least 67 percent by weight iron and less than about 1 percent by weight siliceous compounds.

5. The process according to claim 1 in which the ore is preheated by burning in the preheating operation a portion of the spent gaseous mixture from the reduction zone.

6. A process for the production of molten iron from iron ore comprising:
   a. preheating said ore to below its sintering temperature.
   b. feeding the preheated ore progressively downwardly into and through a vertical reduction zone and simultaneously subjecting it to the reducing action of gaseous mixtures comprising $H_2$ and CO,
   c. adjusting the $H_2$ and CO content of the gaseous mixtures along the vertical reduction zone to provide (i) CO-rich gas at the upper portion of the reducing zone, (ii) a continuously increasing ratio of $H_2$:CO from the upper portion to the lower portion of the reducing zone, and (iii) $H_2$-rich gas at the lower portion of the reducing zone to reduce said ore substantially completely to metallic iron the ratio of $H_2$:CO in the gas mixture in each portion of the reduction zone being that which maintains the temperature in such portion at a preselected value which is below the sintering temperature of the charge and is substantially uniform throughout the entire reduction zone,
   d. maintaining a pool of molten iron directly below the reduction zone,
   e. forcing the reduced iron product from the reduction zone beneath the surface of the pool of molten iron by the weight of the overlying charge, and
   f. melting the reduced iron immersed in the pool of molten iron by supplying the necessary heat directly to said pool.

7. The process according to claim 6 in which the reduction is carried out at a temperature range of about 800° C.–1100° C.

8. The process according to claim 6 in which the CO-rich gas at the upper portion of the reduction zone has a volume ratio of $H_2$:CO of about 0.3 to 0.6:1 and the $H_2$-rich gas at the lower portion of the reduction zone has a volume ratio of $H_2$:CO of about 1 to 25:1.

9. The process according to claim 6 in which the iron oxide ore contains at least 67 percent by weight iron and less than 1 percent by weight siliceous compounds.

10. The process according to claim 6 in which the ore is preheated by burning in the preheating operation a portion of the spent gaseous mixture from the reduction zone.

11. The process according to claim 6 in which the pool of iron is maintained in a molten state by burning a carbonaceous fuel in heat exchange relation with the pool and the combustion products from the burning of the fuel are diverted from the reduction zone.

12. The process according to claim 11 in which the pool of iron is heated by a separate and distinct heating system than that which is used to heat the reducing zone.

13. A process for the production of molten iron from iron oxide ore containing at least 67 percent by weight iron and less than about 1 percent by weight siliceous compounds comprising:
   a. preheating said ore to a temperature of about 800° C.–1100 C.
   b. feeding the preheated ore progressively downwardly into and through a vertical reduction zone and simultaneously subjecting it to the reducing action of gaseous mixtures comprising $H_2$ and CO,
   c. adjusting the $H_2$ and CO content of the gaseous mixtures along the vertical reduction zone to provide (i) CO-rich gas at the upper portion of the reducing zone having a volume ratio of $H_2$:CO of about 0.3 to 0.6:1, (ii) a continuously increasing ratio of $H_2$:CO from the upper portion to the lower portion of the reducing zone, and (iii) $H_2$-rich gas at the lower portion of the reducing zone having a volume ratio of $H_2$:CO of about 1 to 25:1 the ratio of $H_2$:CO in the gas mixtures in each portion of the reducing zone being that which maintains the temperature at about 800° C.–1100° C. and is substantially uniform throughout the entire reduction zone, d. maintaining a pool of molten iron directly below the reduction zone, e. forcing the reduced iron product from the reduction zone beneath the surface of the pool of molten iron by the weight of the overlying charge, and f. melting the reduced iron immersed in the pool of molten iron by supplying the necessary heat directly to said pool.